(12) United States Patent
Arnau

(10) Patent No.: US 10,750,688 B2
(45) Date of Patent: Aug. 25, 2020

(54) I RE GROW

(71) Applicant: Pierre Arnau, Hollywood, FL (US)

(72) Inventor: Pierre Arnau, Hollywood, FL (US)

(73) Assignee: Pierre Arnau, Hollywood, FL (US)

( * ) Notice: Subject to any disclaimer, the term of this patent is extended or adjusted under 35 U.S.C. 154(b) by 228 days.

(21) Appl. No.: 15/816,002

(22) Filed: Jan. 17, 2018

(65) Prior Publication Data

US 2018/0132437 A1     May 17, 2018

Related U.S. Application Data

(63) Continuation of application No. 62/425,115, filed on Nov. 22, 2016.

(51) Int. Cl.
| | | |
|---|---|---|
| *A01G 9/02* | (2018.01) | |
| *A01G 9/029* | (2018.01) | |
| *A01G 31/02* | (2006.01) | |

(52) U.S. Cl.
CPC .............. *A01G 31/02* (2013.01); *A01G 9/02* (2013.01); *A01G 9/029* (2018.02)

(58) Field of Classification Search
CPC . A01G 9/00; A01G 9/02; A01G 9/027; A01G 9/029; A01G 9/045; A01G 9/047; A01G 31/02; A01G 2009/003
USPC ........ 47/39, 40, 63, 65.5, 65.6, 65.9, 68, 79; D11/155, 156
See application file for complete search history.

(56) References Cited

U.S. PATENT DOCUMENTS

| | | | | | |
|---|---|---|---|---|---|
| 289,102 | A | * | 11/1883 | Holden | A01G 27/02 47/79 |
| 3,142,133 | A | * | 7/1964 | Brooks | A01G 9/0295 47/73 |
| 3,751,852 | A | * | 8/1973 | Schrepper | A01G 9/028 47/87 |
| 3,823,508 | A | * | 7/1974 | Takehara | A01G 31/02 47/63 |
| 3,852,912 | A | * | 12/1974 | Diller | A01G 9/028 47/84 |
| 4,279,101 | A | * | 7/1981 | Leroux | A01G 31/02 47/64 |
| 4,285,164 | A | * | 8/1981 | Moore | A01G 27/06 47/69 |
| 4,495,725 | A | * | 1/1985 | Talbott | A01G 9/0295 47/85 |
| 4,514,930 | A | * | 5/1985 | Schorr | A01G 31/02 47/60 |
| 5,117,581 | A | * | 6/1992 | Green | A01G 27/04 47/18 |
| 5,324,657 | A | * | 6/1994 | Tanny | A01G 31/02 428/220 |

(Continued)

*Primary Examiner* — Joshua E Rodden

(57) ABSTRACT

The present invention is designed to regrow a plurality of different vegetables and herbs without the need of artificial light or soil. The invention including a container with side spouts which allow for both easy removal and addition of water. A plurality of different lids are available for being placed on top of the container, each of the lids containing a plurality of drop-in cup like receptacles for accommodating different types of plants. Each of the lids also containing side lips designed to fit over sidewalls of the container for securing the lid on the container. The invention being designed and scaled to fit most window sills and also to work well as a garden starter.

14 Claims, 11 Drawing Sheets

(56) References Cited

U.S. PATENT DOCUMENTS

| | | | | |
|---|---|---|---|---|
| 5,524,387 | A | * | 6/1996 | Whisenant ............... A01G 9/12 47/79 |
| 6,332,287 | B1 | * | 12/2001 | Geraldson .............. A01G 27/02 47/79 |
| 6,381,901 | B1 | * | 5/2002 | Friedman ............... A01G 9/028 206/752 |
| 8,312,674 | B2 | * | 11/2012 | Adams ................... A01G 27/04 47/66.7 |
| 10,251,350 | B2 | * | 4/2019 | Botman ................ A01G 22/00 |
| 2003/0066238 | A1 | * | 4/2003 | Whisenant ............ A01G 31/02 47/79 |
| 2006/0272211 | A1 | * | 12/2006 | Motelow ................. A01G 9/02 47/79 |
| 2016/0235023 | A1 | * | 8/2016 | Thoma ................... A01G 31/02 |
| 2018/0132437 | A1 | * | 5/2018 | Arnau ...................... A01G 9/02 |
| 2018/0338440 | A1 | * | 11/2018 | Dearinger ............ A01G 9/0297 |

* cited by examiner

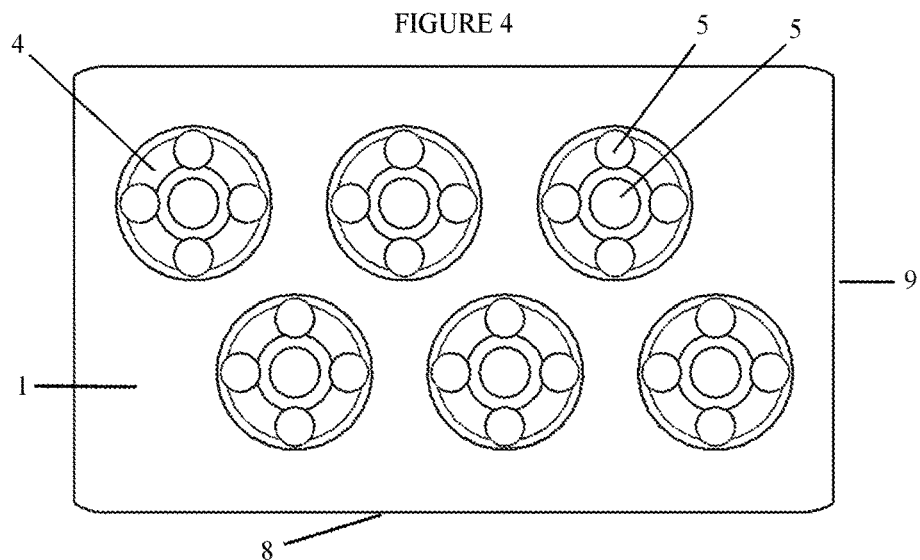
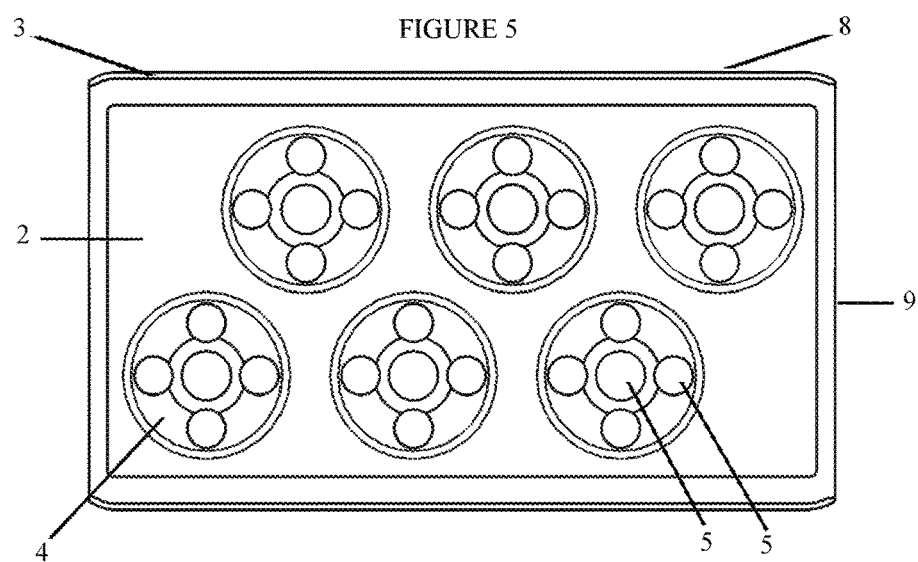
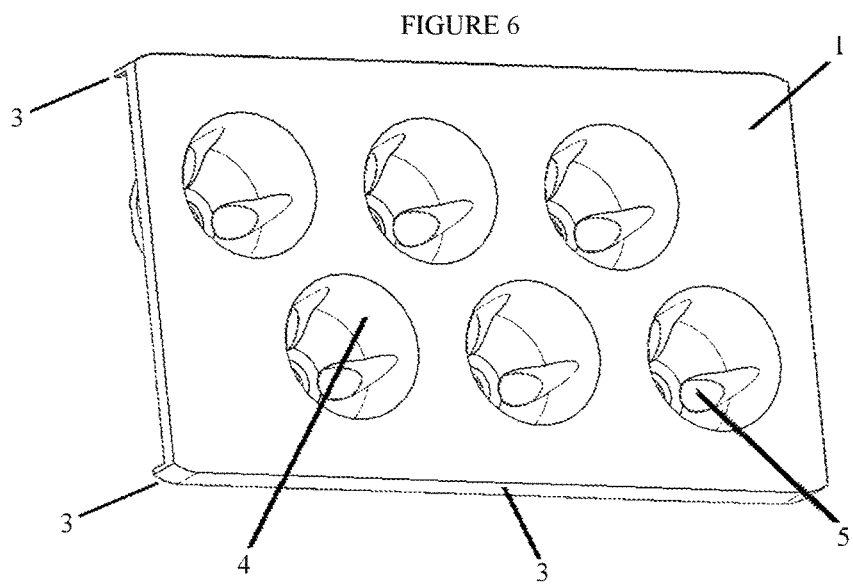

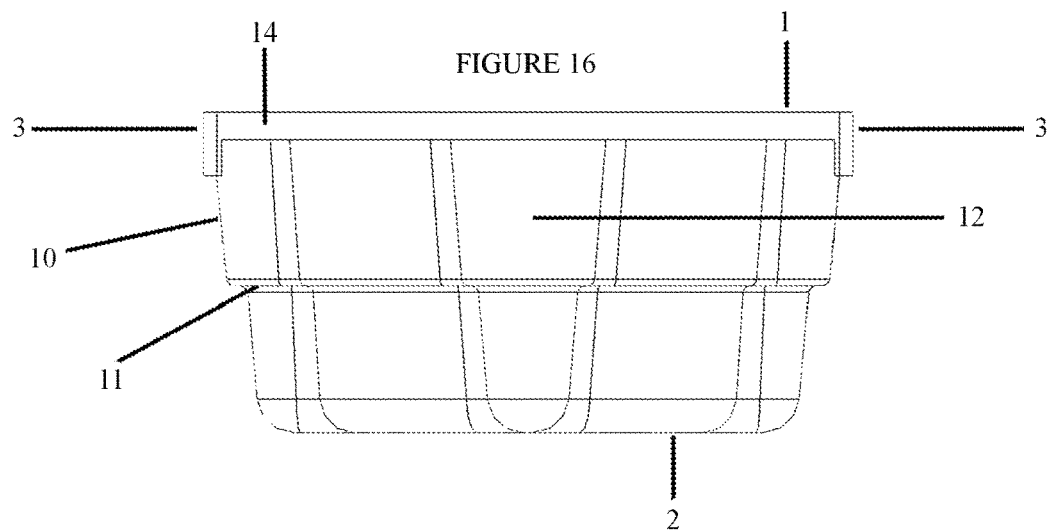
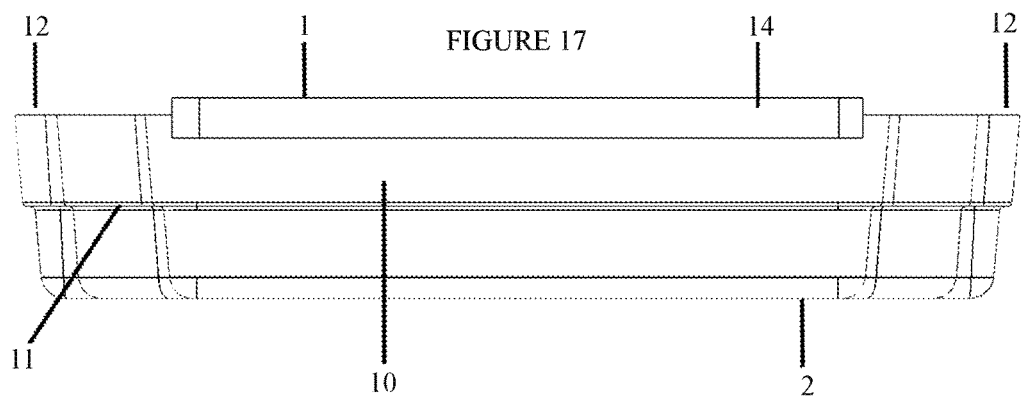
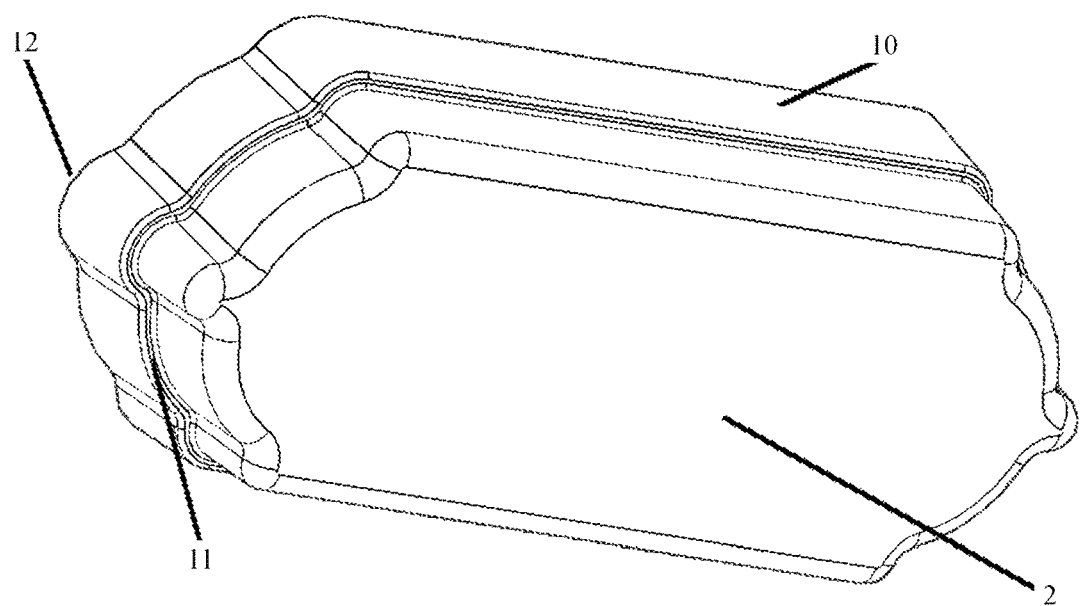

US 10,750,688 B2

I RE GROW

FIELD OF THE INVENTION

The present invention relates to the field of growing and regrowing vegetables and herbs alike. More specifically, the present invention relates to a system in the form of a container with a lid having receptacles designed to accommodate a variety of vegetables and herbs for growing purposes.

SUMMARY OF THE INVENTION

The invention titled "I Re Grow" is intended for regrowing certain vegetables and herbs alike such as: scallion, garlic, celery, thyme, romaine lettuce, ginger, carrot tops . . . just to name a few, by simply cutting and placing the respective vegetables and herbs in the "I Re Grow" system. The system capable of being placed Indoors, preferably a kitchen, for the convenience of cut and cook but it can be placed in any room with natural light or even outdoors. The "I Re Grow" system can be used with non-edible plants as well.

The system including a container with side spouts which allow for both easy removal and addition of water. A plurality of different lids are available for being placed on top of the container, each of the lids containing a plurality of drop-in cup like receptacles for accommodating different types of plants. Each of the lids also containing side lips designed to fit over sidewalls of the container for securing the lid on the container. The container and lid being made from transparent polycarbonate for durability and aesthetics. The system being designed and scaled to fit most window sills and also to work well as a garden starter.

BRIEF DESCRIPTION OF THE DRAWINGS

FIG. 4 is a top view of the first embodiment of the lid;
FIG. 5 is a bottom view of the first embodiment of the lid;
FIG. 6 is a top perspective view of the first embodiment of the lid;
FIG. 16 is short side view of the container;
FIG. 17 is a long side view of the container;
FIG. 18 is a bottom perspective view of the container.

LIST OF REFERENCE NUMERALS

1—Top of lid/support
2—Bottom of lid/container
3—Lid lip
4—Drop in cup like receptacle
5—Rooting and draining holes
6—Rooting and draining holes
7—Holes in top of lid/support
8—Long side of the lid/support
9—Short side of the lid/support
10—Side wall of the container
11—Support rest line of the container
12—Spout of the container
13—Floor of the container
14—Lid on the container
15—Open ended drop in receptacle

DETAILED DESCRIPTION OF THE INVENTION

Figure 1:
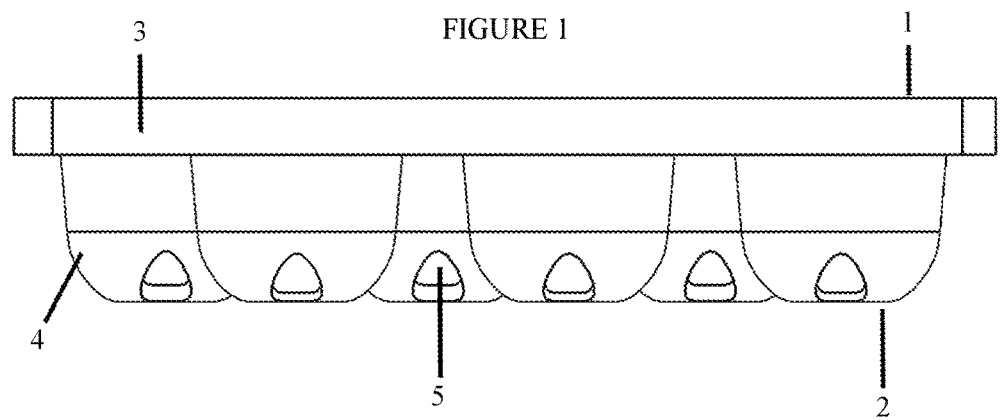
FIG. 1 is a long side view of a first embodiment of the lid.
Figure 2:
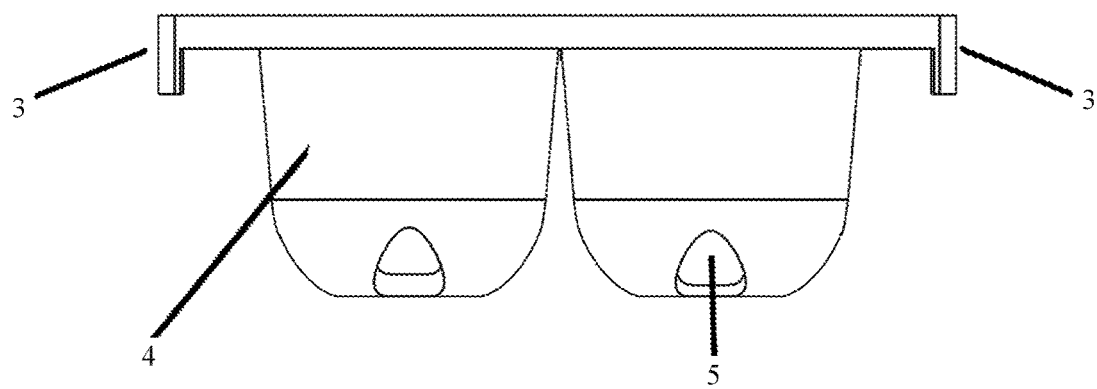
FIG. 2 is a short side view of the first embodiment of the lid.
Figure 3:
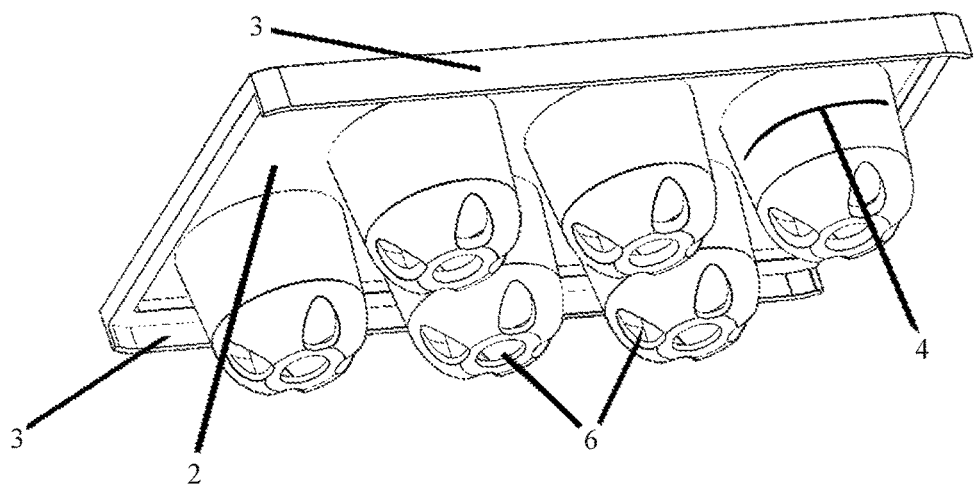
FIG. 3 is a bottom perspective view of the first embodiment of the lid.

FIGS. 1-6 show a first embodiment of a lid. The lid having a top 1, a bottom 2, a lid lip 3 located on two of the respective long sides 8 of the lid, and no lid lip 3 is present on the short sides 9 of the lid. The lid containing a plurality of staggered, drop in cup like receptacles 4, each of the receptacles 4 containing a central rooting and draining hole 6 which is radially surround by a plurality of additional rooting and draining holes 5.

Figure 7:
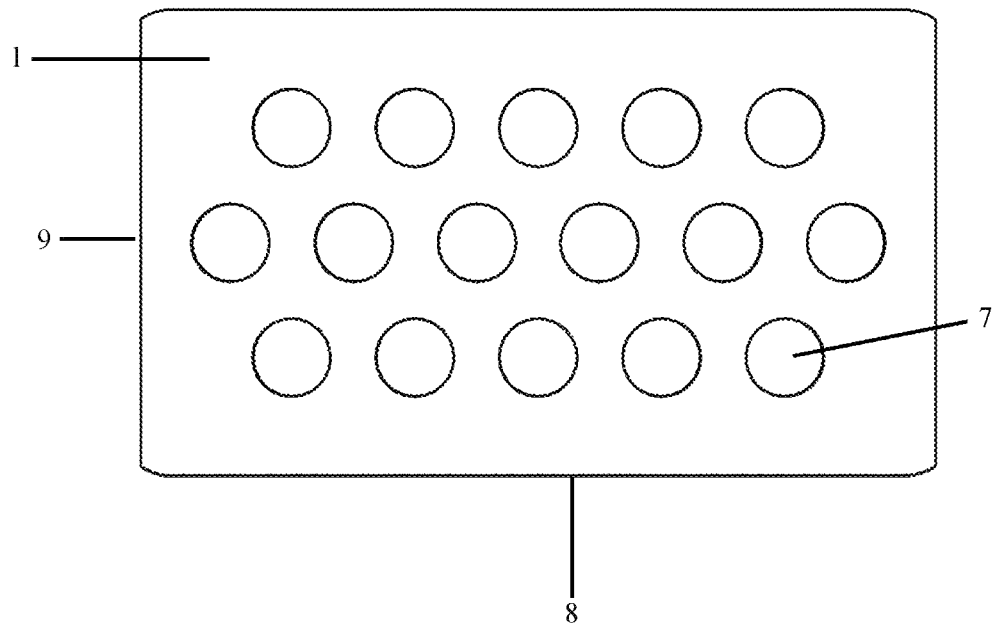
FIG. 7 is a top view of a second embodiment of the lid.
Figure 8:
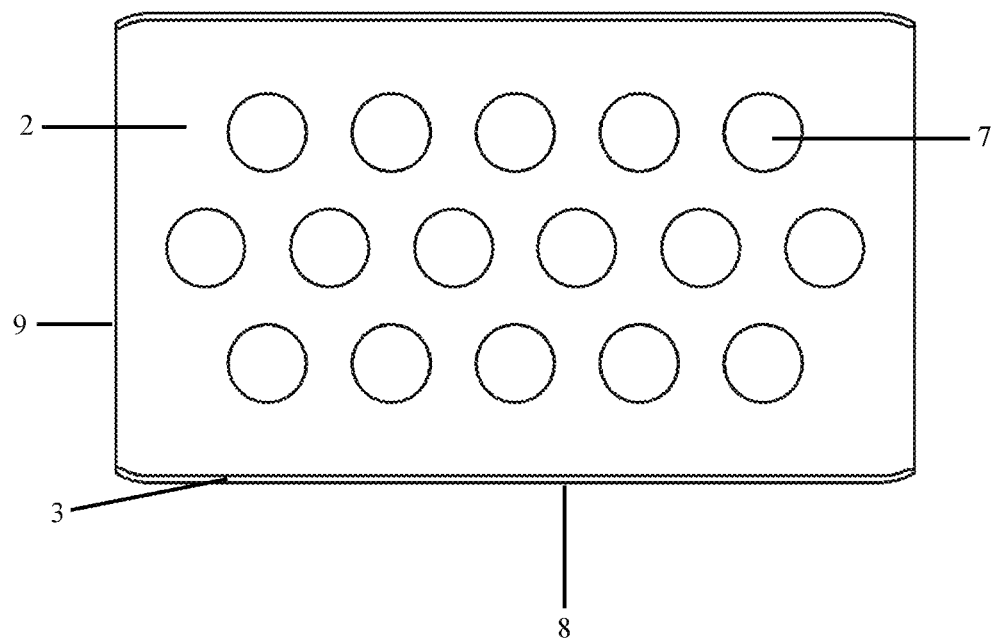
FIG. 8 is a bottom view of the second embodiment of the lid.
Figure 9:
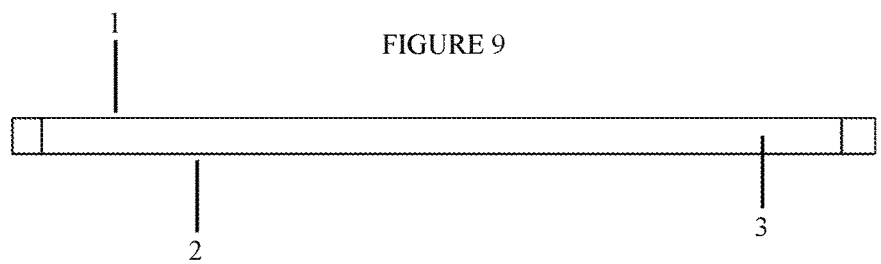
FIG. 9 is a long side view of the second embodiment of the lid.
Figure 10:
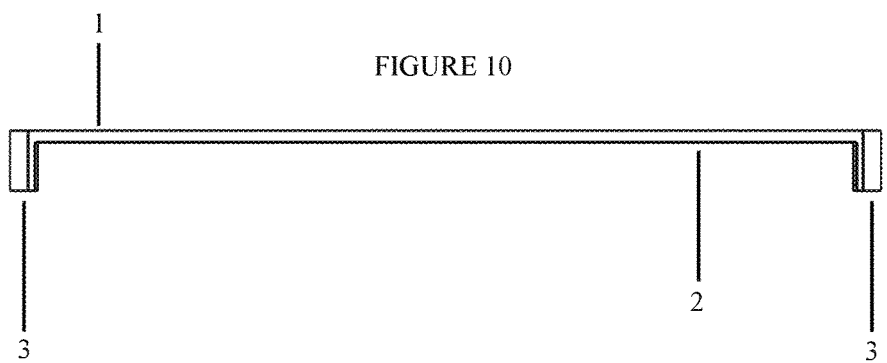
FIG. 10 is a short side view of the second embodiment of the lid.
Figure 11:
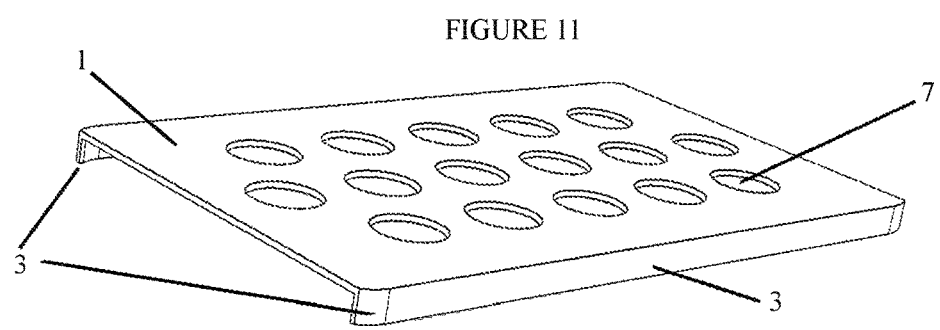
FIG. 11 is a top perspective view of the second embodiment of the lid.
Figure 12:
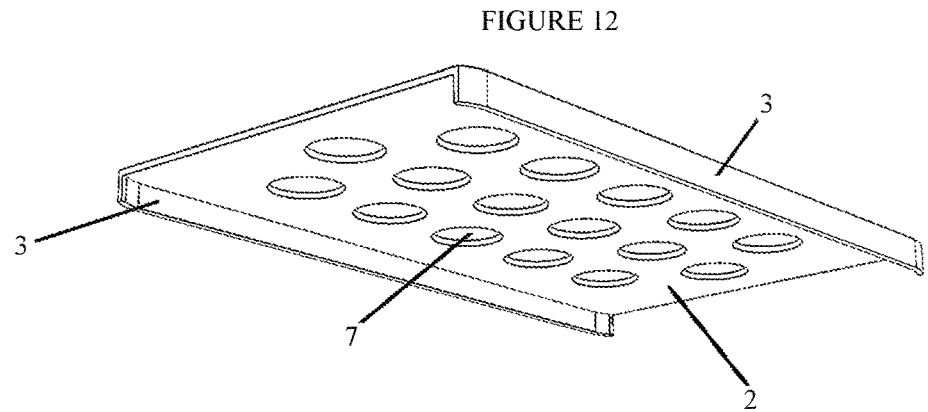
FIG. 12 is a bottom perspective view of the second embodiment of the lid.

FIGS. 7-12 show a second embodiment of the lid. The second embodiment of the lid having a plurality of holes 7 located in a top 1 of the lid.

Figure 13:
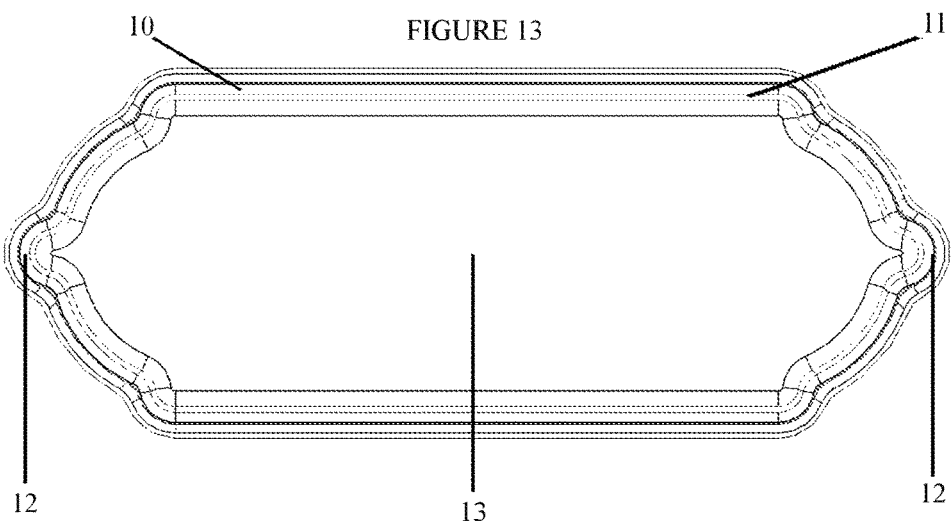
FIG. 13 is a top view of the container.
Figure 14:
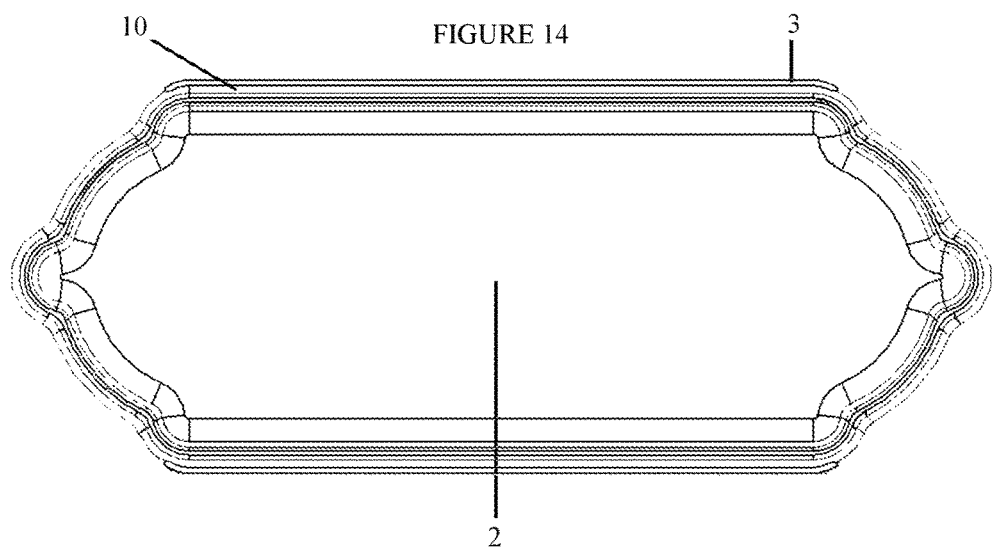
FIG. 14 is a bottom view of the container.
Figure 15:
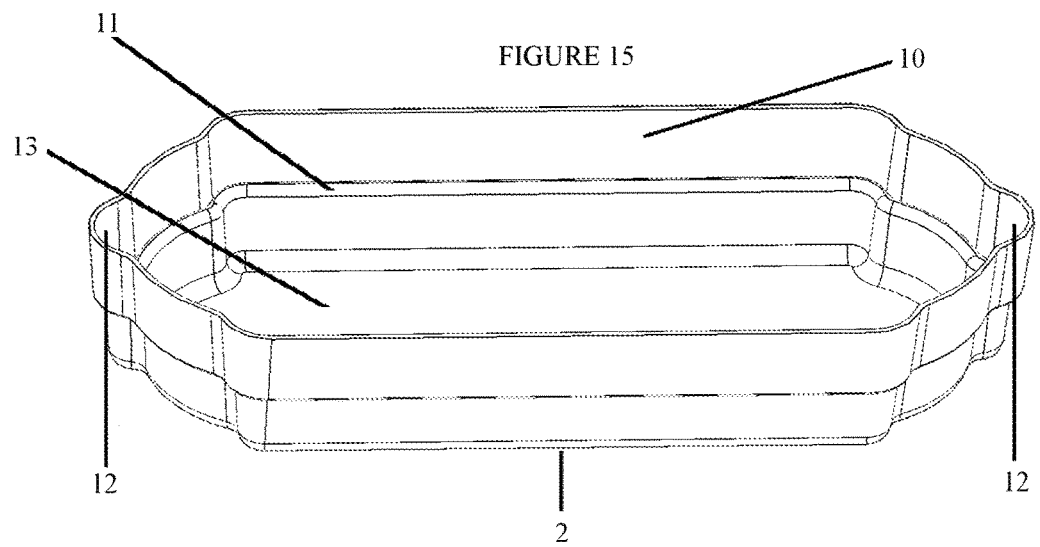
FIG. 15 is a top perspective view of the container.

FIGS. 13-18 show the container. The container having a two short side walls, two long side walls, a support rest line 11 around the interior of the short and long side walls, a spout 12 located at each of two longitudinal ends of the container along the respective short side walls, and a floor 13. FIGS. 16 and 17 show the lid forming a lid/cover 14. When the lid is placed on the container, each lip 3 of the lid fits over top of a respective one of the long side walls of the container, and the spouts 12 are not covered and are open end to allow for the additional and removal of water to the container.

Figure 19:
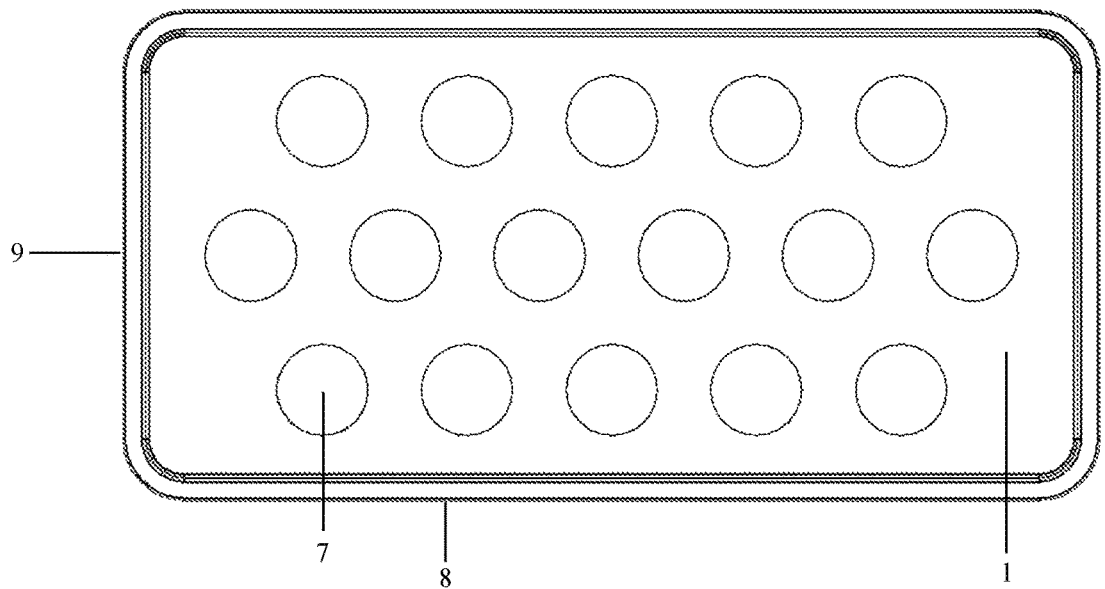
FIG. 19 is a top view of a support.
Figure 20:
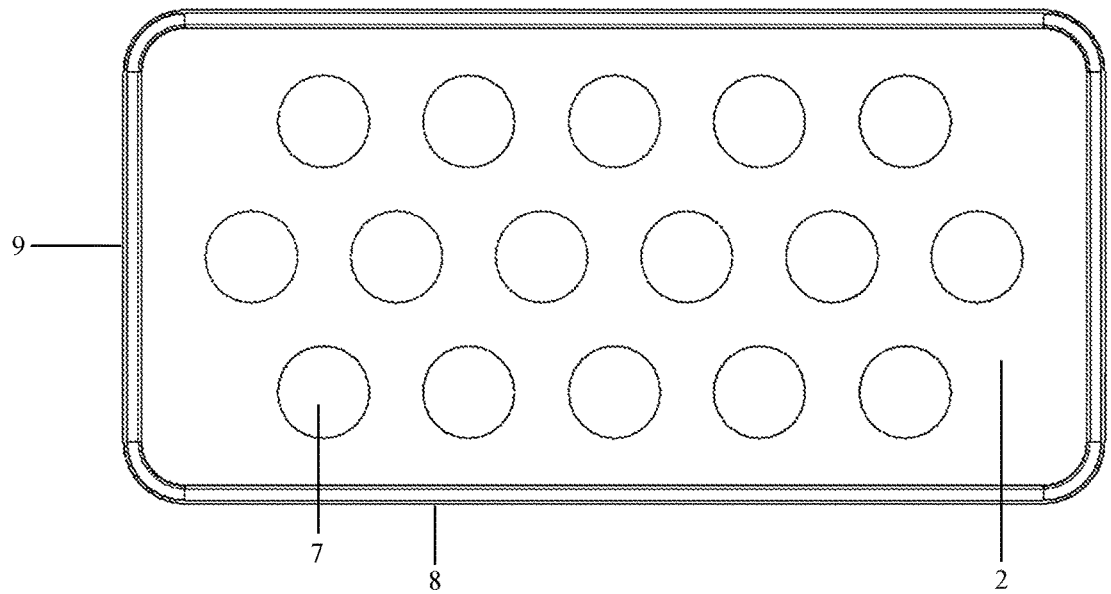
FIG. 20 is a bottom view the support.
Figure 21:
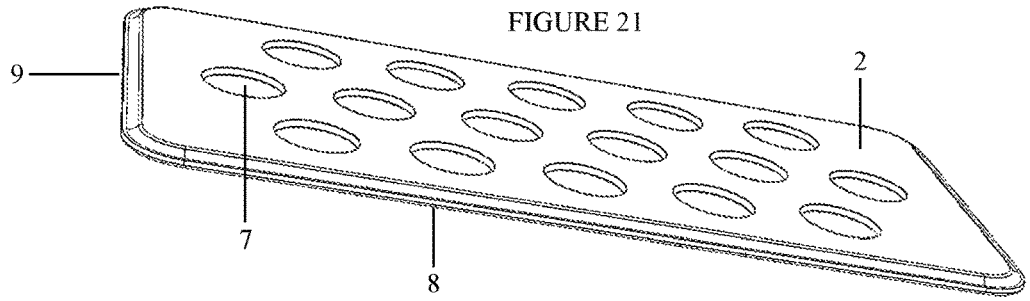
FIG. 21 is a bottom perspective view of the support.
Figure 22:
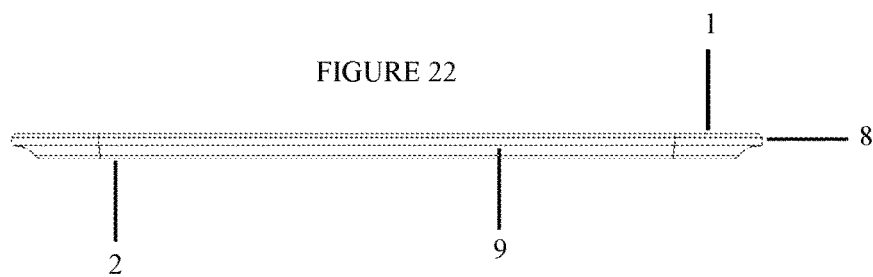
FIG. 22 is a short side view of the support.
Figure 23:
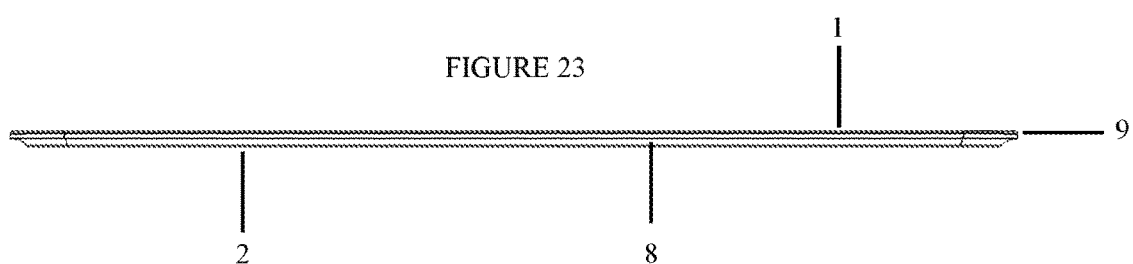
FIG. 23 is a long side view of the support.
Figure 24:
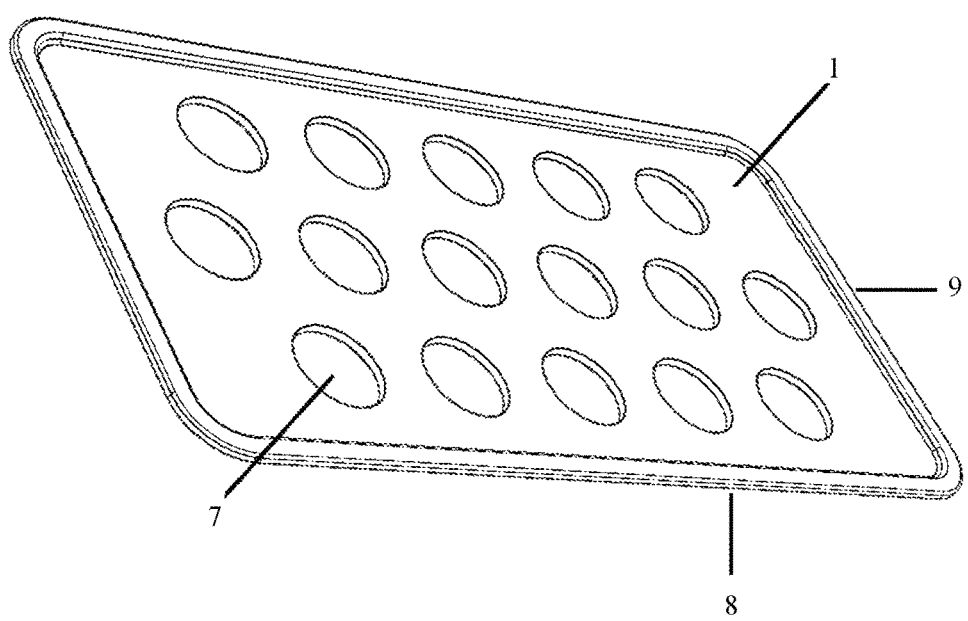
FIG. 24 is a top perspective view of the support.

FIGS. 19-24 show a support which can be placed within the container.

Figure 25:
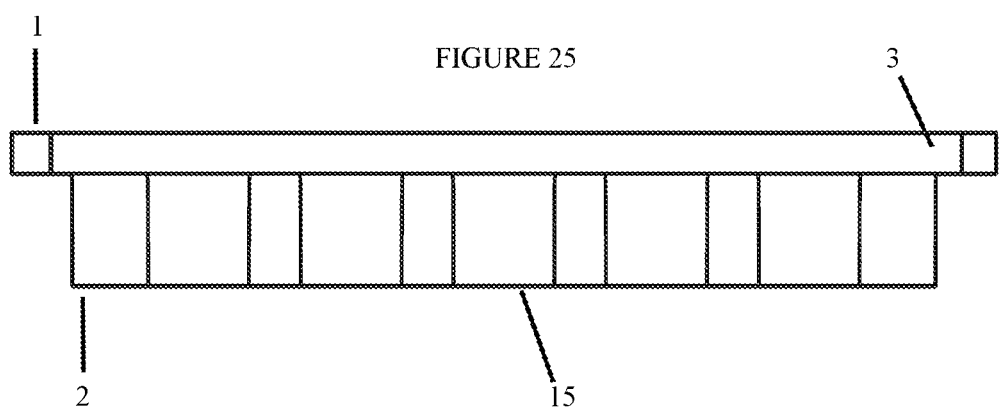
FIG. 25 is a long side view of a third embodiment of the lid.
Figure 26:
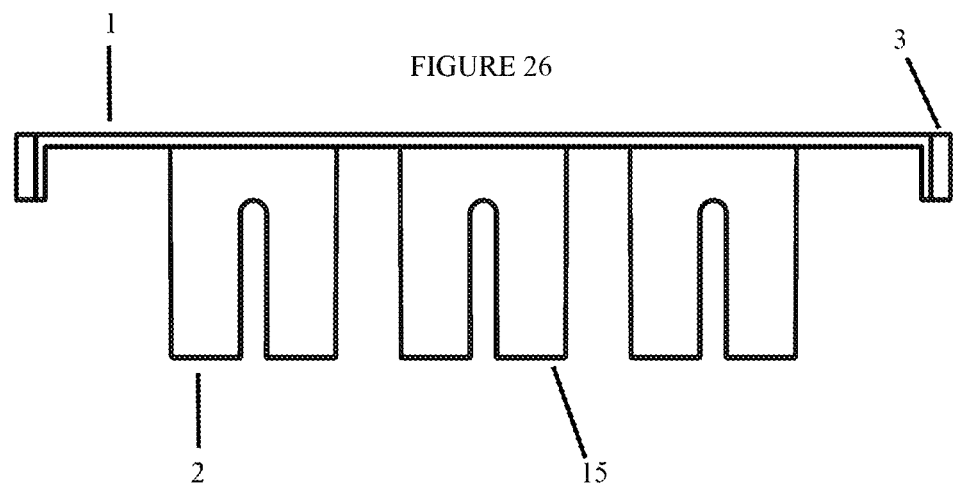
FIG. 26 is a short side view of the third embodiment of the lid.
Figure 27:
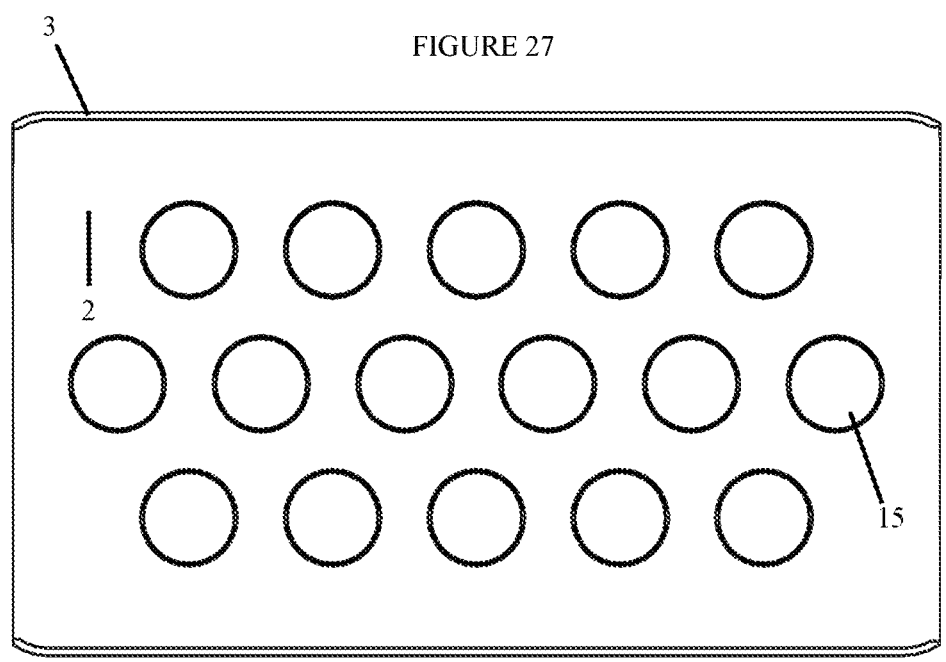
FIG. 27 is a bottom view of the third embodiment of the lid.
Figure 28:
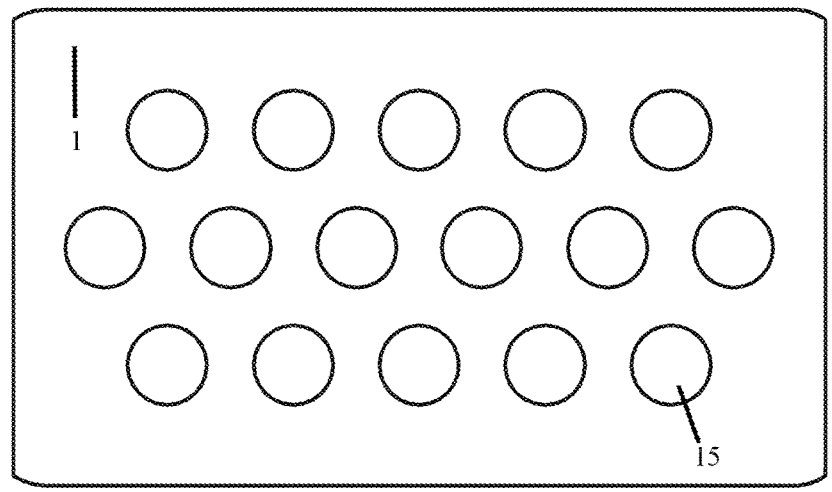
FIG. 28 is a top view of the third embodiment of the lid.
Figure 29:
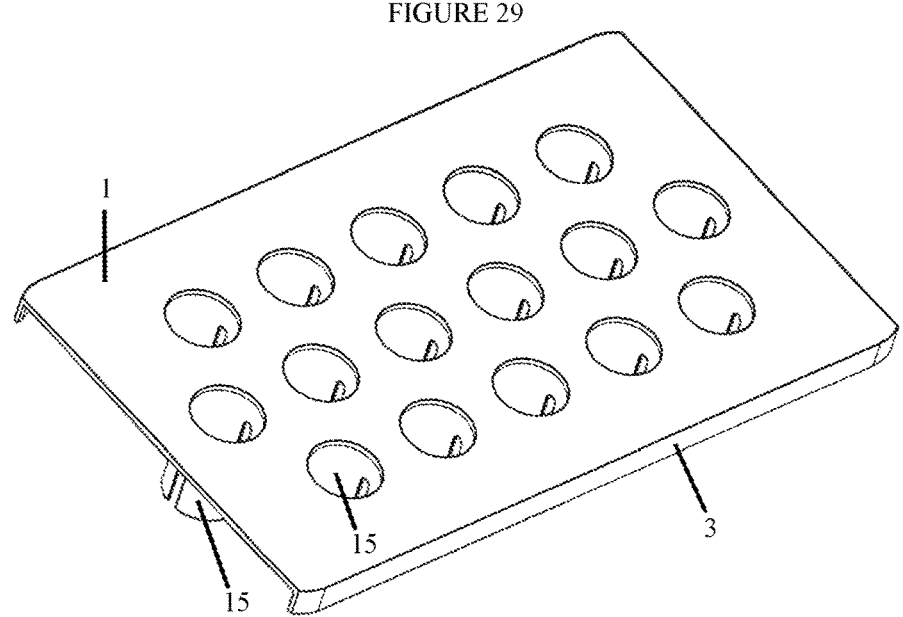
FIG. 29 is a top perspective view of the third embodiment of the lid.
Figure 30:
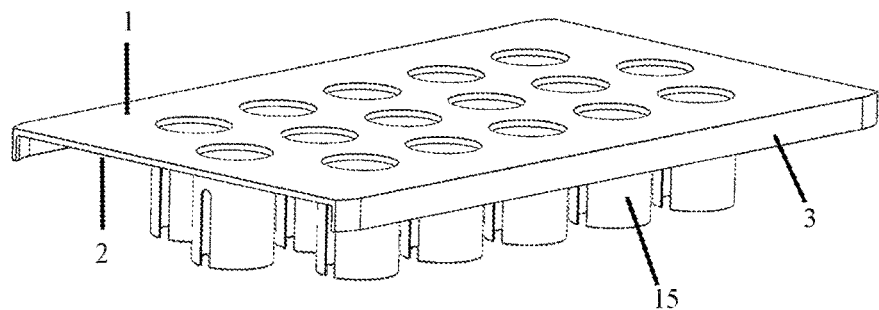
FIG. 30 is a top perspective view of the third embodiment of the lid.
Figure 31:
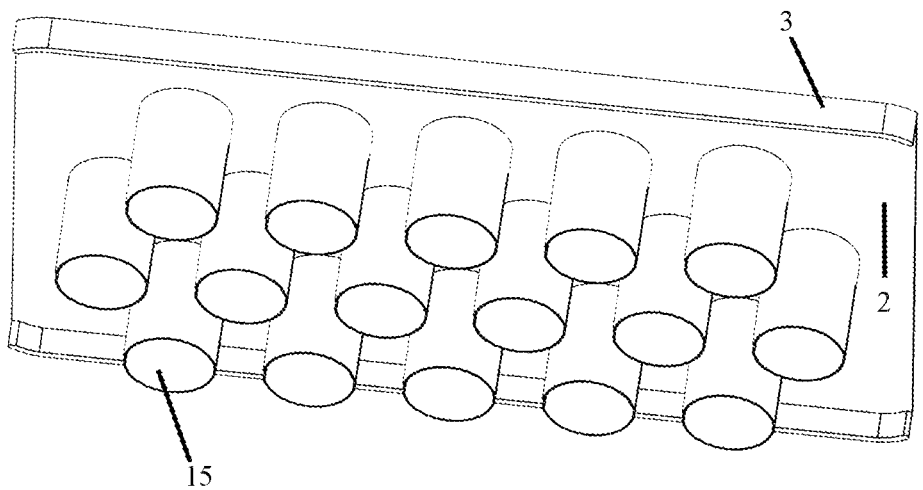
FIG. 31 is a bottom perspective view of the third embodiment of the lid.
Figure 32:
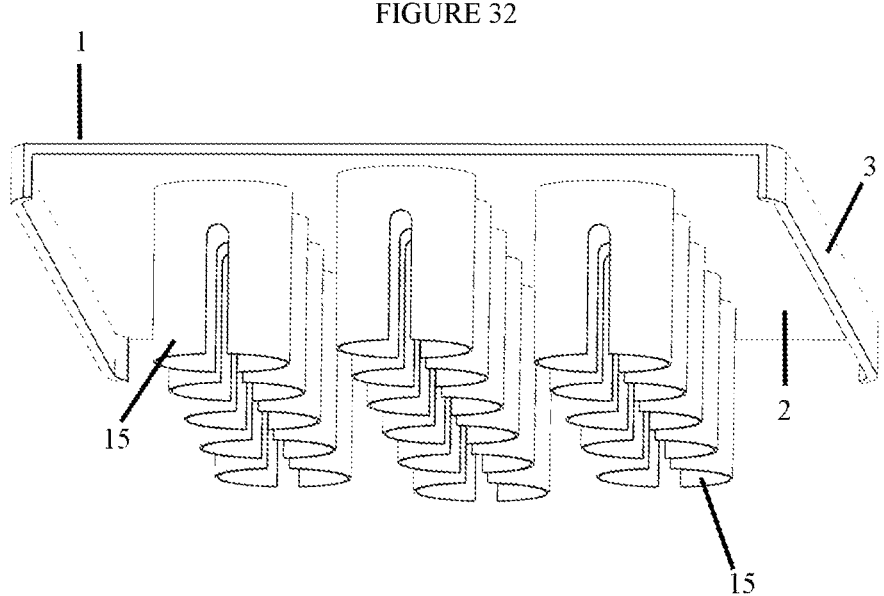
FIG. 32 is a bottom perspective view of the third embodiment of the lid.

FIGS. 25-32 show a third embodiment of the lid. In this embodiment, the receptacles 15 are in the form of open ended receptacles 15 each containing a pair of aligned, vertically extending slits.

The invention claimed is:

1. A regrowing system, the system comprising:
   a container, the container having two short side walls, two long side walls, a floor, a support rest line around an interior of the short and long side walls and above the floor, and a respective spout located at each of two longitudinal ends of the container along the respective short side walls;
   a lid having a top, a bottom, two short sides, two long sides, a respective lid lip located on each of the long sides of the lid, with ends of the lips forming openings at each of the respective short sides of the lid, the top of the lid including a plurality of holes;
   wherein when the lid is placed on the container, each lip of the lid fits over top of a respective one of the long side walls of the container, and the spouts are not covered and are open ended to allow for the addition and removal of water to the container.

2. The system as described in claim 1, wherein each of the holes of the lid has a respective drop in cup like receptacle.

3. The system as described in claim 2, wherein each of the receptacles contains a central rooting and draining hole which is radially surround by a plurality of additional rooting and draining holes.

4. The system as described in claim 1, wherein each of the holes of the lid has a respective open ended receptacle.

5. The system as described in claim 4, wherein each of the receptacles contains a pair of aligned, vertically extending slits.

6. The system as described in claim 1, wherein the system includes a support which can be placed within the container.

7. The system as described in claim 6, wherein the support includes a plurality of holes.

8. A method of regrowing vegetables and herbs in a system, the method comprising:
   providing a container, the container having two short side walls, two long side walls, a floor, a support rest line around an interior of the short and long side walls and above the floor, and a respective spout located at each of two longitudinal ends of the container along the respective short side walls;
   providing a lid having a top, a bottom, two short sides, two long sides, a respective lid lip located on each the long sides of the lid, with ends of the lips forming openings at each of the respective short sides of the lid, the top of the lid including a plurality of holes;
   placing the lid on the container, each lip of the lid fitting over top of a respective one of the long side walls of the container, whereby the spouts are not covered by the lid and are open ended to allow for the addition and removal of water to the container;
   the vegetables and herbs being placed within and through the holes of the lid.

9. The method as described in claim 8, wherein each of the holes of the lid has a respective drop in cup like receptacle.

10. The method as described in claim 9, wherein each of the receptacles contains a central rooting and draining hole which is radially surround by a plurality of additional rooting and draining holes.

11. The method as described in claim 8, wherein each of the holes of the lid has a respective open ended receptacle.

12. The method as described in claim 11, wherein each of the receptacles contains a pair of aligned, vertically extending slits.

13. The method as described in claim 8, wherein the system includes a support which can be placed within the container.

14. The method as described in claim 13, wherein the support includes a plurality of holes.

* * * * *